United States Patent
Dorresteyn (10) Patent No.: US 11,594,778 B2
(45) Date of Patent: Feb. 28, 2023

(54) CELL HOLDER WITH INTERMEDIATE TRAY

(71) Applicant: Damon Motors Inc., Vancouver (CA)

(72) Inventor: Derek Dorresteyn, Mill Valley, CA (US)

(73) Assignee: Damon Motors Inc., Vancouver (CA)

( * ) Notice: Subject to any disclaimer, the term of this patent is extended or adjusted under 35 U.S.C. 154(b) by 221 days.

(21) Appl. No.: 17/144,131

(22) Filed: Jan. 7, 2021

(65) Prior Publication Data

US 2021/0280936 A1  Sep. 9, 2021

Related U.S. Application Data (60) Provisional application No. 62/985,290, filed on Mar. 4, 2020, provisional application No. 62/985,280, filed on Mar. 4, 2020.

(51) Int. Cl.
*H01M 50/204* (2021.01)
*H01M 50/262* (2021.01)
*H01M 50/507* (2021.01)
*H01M 10/613* (2014.01)
*H01M 10/6554* (2014.01)
*H01M 50/271* (2021.01)

(52) U.S. Cl.
CPC ....... *H01M 50/204* (2021.01); *H01M 10/613* (2015.04); *H01M 10/6554* (2015.04); *H01M 50/262* (2021.01); *H01M 50/271* (2021.01); *H01M 50/507* (2021.01)

(58) Field of Classification Search
CPC ............. H01M 50/204; H01M 50/213; H01M 50/207; H01M 10/6557
See application file for complete search history.

(56) References Cited

U.S. PATENT DOCUMENTS

| | | | |
|---|---|---|---|
| 6,653,003 B1 | 11/2003 | Tsai et al. | |
| 2009/0220852 A1* | 9/2009 | Fujii | H01M 10/6566 429/97 |
| 2013/0183544 A1 | 7/2013 | Yoshioka et al. | |
| 2018/0062226 A1* | 3/2018 | Raiser | H01M 10/6554 |
| 2020/0381683 A1* | 12/2020 | Shimizu | H01M 50/291 |

FOREIGN PATENT DOCUMENTS

DE  102012110644 A1 *  5/2014  ..........  H01M 2/1022

OTHER PUBLICATIONS

Maching translation of DE102012110644 (Year: 2022).*
(Continued)

*Primary Examiner* — Maria Laios
(74) *Attorney, Agent, or Firm* — Damien G. Loveland (57) ABSTRACT

A cell holder made up of a top tray, an intermediate tray and a frame. Cells are placed with minimal force in the frame to stand proud of it. The intermediate tray is placed over the projecting tops of the cells and serves to locate the cells. A busbar in the intermediate tray is connected to one set of terminals. A top tray is placed over the intermediate tray and snap-locked through the intermediate tray to the frame. The snap-lock distance is short. A busbar in the top tray is connected to the other set of terminals. The top tray shields the first busbar. Vents may be included to allow for the escape of hot cell gases in the event of failure.

17 Claims, 5 Drawing Sheets

(56) References Cited

OTHER PUBLICATIONS

Patent Cooperation Treaty International Search Report dated May 10, 2021 issued for the parent application assigned International Application No. PCT/CA2021/050225 with an International Filing Date of Feb. 25, 2021.

Patent Cooperation Treaty Written Opinion of the International Searching Authority dated May 10, 2021 issued for the parent application assigned International Application No. PCT/CA2021/050225 with an International Filing Date of Feb. 25, 2021.

\* cited by examiner

CELL HOLDER WITH INTERMEDIATE TRAY

TECHNICAL FIELD

This invention relates to a system for holding electrical cells. More specifically, it relates to a cell holder that is an assembly of trays and a frame to host one or more cells.

BACKGROUND

The demand for electrically based vehicles and devices has increased these last years due to their relatively low environmental impact compared to prior technologies. The development of safer and more efficient electrical cells and associated technologies is important for the economic expansion of these fields.

Safely assembling and mechanically retaining battery cells in a battery pack can be difficult. Failures to correctly assemble the battery packs or loose cells in the packs may cause an electrical danger or fire, either during manufacturing, in use or in service.

This background is not intended, nor should be construed, to constitute prior art against the present invention.

SUMMARY OF INVENTION

The present invention is a system for securing cells into a cell holder. The system may provide a small assembly stroke distance. The cells do not need to be pressed into place, which reduces chances of damaging a cell during the assembly of a cell holder. The cell holder provides sufficient mechanical restraint of the cells without the use of traditional screws or connectors, which may otherwise become loose, creating the risk of electrical shock or fire.

The assembly of the cell holder involves slipping the cells into a frame with little to no force and then positioning an intermediate tray onto the frame to help locate the cells. The cell holder is then secured with a top tray, which is a short stroke snap fit tray with integral locating features that locate it relative to the frame. The two parts of the tray assembly are snapped together to the frame in a pressing operation, securing the cells in place with no screws or fasteners.

Disclosed herein is a cell holder for one or more cells comprising: a frame that hosts one or more cells such that a portion of each cell projects beyond a top of the frame; an intermediate tray on top of the frame and having one or more recesses each of which accommodate one of the projecting portions of the one or more cells; and a top tray on top of the intermediate tray and fastened to the frame through the intermediate tray, thereby holding the intermediate tray in place.

Also disclosed is a method for assembling a cell holder for one or more cells comprising: placing one or more cells in a frame that hosts the one or more cells such that a portion of each cell projects beyond a top of the frame; placing an intermediate tray over the frame, the intermediate tray having one or more recesses each of which accommodate one of the projecting portions of the one or more cells; connecting a busbar in the intermediate tray to a terminal on each of the one or more cells; placing a top tray over the intermediate tray; fastening the top tray to the frame through the intermediate tray, thereby holding the intermediate tray in place; and connecting another busbar in the top tray to a second terminal on each of the one or more cells.

In some embodiments, the intermediate tray, the top tray, or both the intermediate and top trays define vents between top surfaces of the one or more cells and an exterior of the cell holder.

BRIEF DESCRIPTION OF DRAWINGS

The following drawings illustrate embodiments of the invention, which should not be construed as restricting the scope of the invention in any way.

DESCRIPTION

A. Glossary

Cell or electrical cell—this refers to a device capable of generating electricity from a chemical reaction. Cells may be rechargeable.

Clearance distance—this refers to the shortest distance through air between two conductors, such as the positive and negative terminals of a cell. It may be a line of sight between the two conductors or it may include multiple straight segments if there is an insulting obstruction on the direct path between the conductors.

Creepage distance—this refers to the shortest distance across the surface of an insulator between two conductors, such as the positive and negative terminals of a cell.

Busbar—this refers to a metallic strip, which is used as an electrical conductor for multiple components.

Snap lock—this refers to a device or a feature on a device that is capable of fastening two or more components together. One component is fastened to another component by one portion of the snap lock being set in position relative to the other portion of the snap lock, either by sliding, rotating or any other suitable movement. Snap locks may be permanent or temporary, or irreversible or reversible.

B. Exemplary Embodiment

Figure 1:
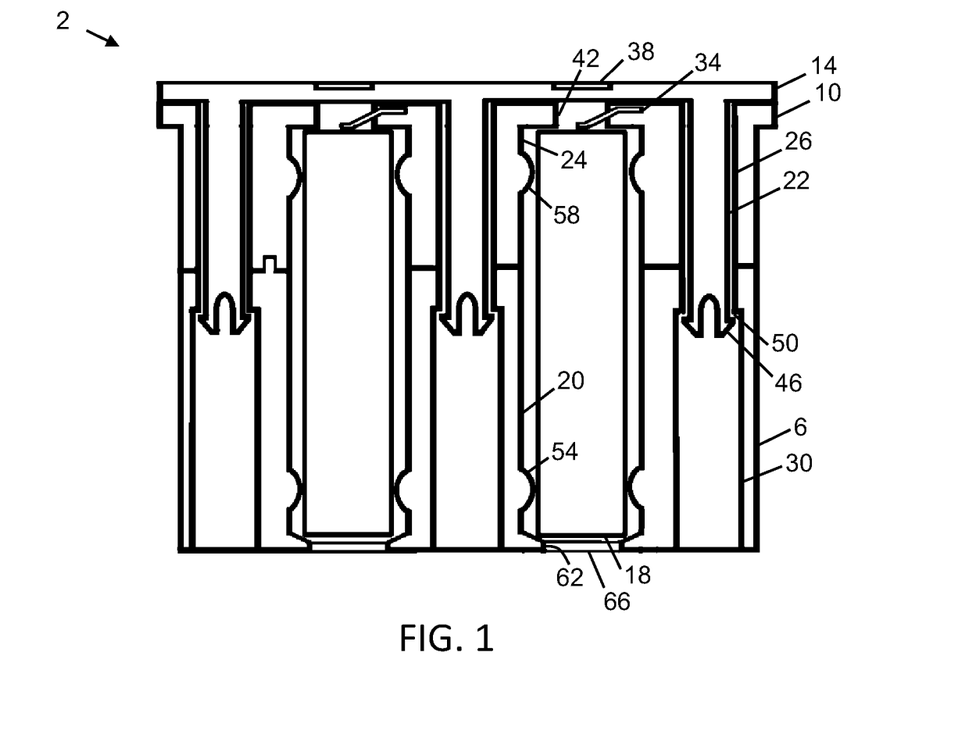
FIG. 1 is a schematic drawing representing a sectional view of the cell holder seen from the side, according to an embodiment of the present invention.

Referring to FIG. 1, there is shown a sectional drawing of the cell holder 2 as seen from the side. The cell holder 2 is an assembly of a cell holding frame or cell frame 6, an intermediate tray 10 and a top tray 14. A cell 18 to be hosted by the cell holder 2 is inserted into a cavity 20 present in the cell frame 6. A top portion of the cell 18 projects upwards out of the frame 6. The intermediate tray 10 is placed on top of the cell frame 6 and has a recess 24 that accommodates the projecting portion of the cell when the cell 18 is already in place. The intermediate tray 10 and the cell frame 6 enclose the battery cells 18.

The top tray 14 is placed on top of the intermediate tray 10. The top tray 14 has studs 22 that are inserted into holes 26 of the intermediate tray 10 and then through to holes 30 in the cell frame 6. A positive busbar 34 is located in the intermediate tray 10. A negative busbar 38 is located in the top tray 14. The positive busbar 34 extends from the intermediate tray 10 into the hole 42 of the intermediate tray to contact the positive terminal at the top of the cell 18.

The hole 26 in the intermediate tray 10 is aligned with the hole 30 in the frame 6 in order for the stud 22 to slide properly through them. The stud 22 has at its extremity a snap lock 46 that goes through the intermediate tray 10 to be fastened into the cell frame 6. The snap lock 46 has a head that engages with a step 50 or other retaining surface formed between wider and narrower portions of the hole 30 in the cell frame 6. By locking the top tray 14 to the cell frame 6, the snap lock 46 fastens the top tray 14, the intermediate tray 10 and the cell frame 6 together. In some embodiments, the configuration of the snap lock 46 of the stud is different. Any type of snap lock may be used so long as it fastens the top tray 14 to the cell frame 6 as the top tray and the cell frame are pressed together.

The deforming action of the snap lock 46 into the plastic mating feature, e.g. step 50, in the cell frame 6 results in the cell 18 being retained in the cell holder as well as both the top tray 14 and the intermediate tray 10. The snap lock 46 slips easily into the cavities 26 and 30 in order to be engaged with the step 50 in the hole 30. The pressure needed to be applied to the top tray 14 in order to fasten the assembly is generally low. For example, the cell holder is fastened together using hand pressure, which may be something more than that needed for a slip fit and something less than that needed for a press fit. The extent of the movement required to locate the top tray 14 ready for fastening is about equal to the height of the snap lock stud 26. The extent of the movement required to fasten the cell holder together is about equal to the height of the snap lock 46. In other embodiments, the extent of the movement may be reduced by making the height of the intermediate tray smaller, and by raising the locking feature, e.g. step 50, in the cell frame.

The trays 10 and 14 are made of a flexible material that provides electrical insulation between the busbars 34 and 38. In other embodiments, the material may be rigid. When fully assembled, the cell holder 2 may be considered to be touch-safe as the positive busbar is largely covered by the top tray 14 and the connection to the positive busbar may be covered with a cap and/or located away from the exposed, negative busbar. Assembly workers, not being exposed to the cell terminals, can handle the assembled cell holder more safely. In some embodiments, a sealing material, adhesive or coating is placed between the trays 10 and 14 and between the intermediate tray 10 and the cell frame 6. In some embodiments, a paper-like flame barrier material such as Nomex® is incorporated into the cell holder 2 at positions where hot gas from the cells may come in contact with the plastic.

When the top tray 14 is locked into the cell frame 6, it is irreversible. This is achieved by using irreversible snap locks. In some embodiments, the assembly is reversible, using reversible snap locks, however in this case the strength of the assembly may be less than that of an irreversible fit.

In some embodiments, the height of the assembly is checked after the top tray 14 is locked to the cell frame 6, via the intermediate tray 10, in order to make sure that all the snap locks are engaged properly.

The cavity 20 in the cell frame 6 that hosts the cell battery 18 has three bottom protrusions 54 on its vertical wall. The bottom protrusions 54 are spaced around the circumference of the cavity 20. In the same manner, the recess 24 in the lower portion of the intermediate tray 10 has three top protrusions 58. The top protrusions 58 and the bottom protrusions 54 form guides to hold the cell 18 and secure it centrally in position in the volume formed by the cavity 20 and recess 24. Each set of protrusions 54, 58 aligns the cell in the center of the cavity 20 or recess 24 in the respective plane of the protrusions.

The top protrusions 58 are molded on the wall of the recess 24 of the intermediate tray 10. The bottom protrusions 54 are molded on the wall of the cavity 20 of the cell frame 6. In some embodiments, the geometry of the protrusions 54, 58 in the cell frame 6 and intermediate tray 10 is different to that shown in order for the intermediate tray and the cell frame to be more easily molded. In some embodiments, the protrusions 54 and 58 are separate elements from the intermediate tray 10 and the cell frame 6 rather than being integral with the trays. The top protrusions 58 and the bottom protrusions 54 prevent the cell 18 from moving sideways or tilting in the cavity 20 and recess 24. As a result, the top protrusions 58 and the bottom protrusions 54 facilitate efficient contact between the busbars 34 and 38 and the cells 18 during assembly. The top protrusions 58 and the bottom protrusions 54 enforce an air gap around the cell 18. In some embodiments, the top protrusions 58 and the bottom protrusions 54 have a rounded profile to avoid damaging the wall of the cell 18.

At the bottom of the cavity 20 of the cell frame 6, there is a ledge 62. The ledge 62 supports the cell 18 from below. The ledge 62 and bottom surface of the cell 18 form a well 66 to accommodate an epoxy resin material that is used to adhere the cells to a cold plate. Heat from the cells is conducted away through the epoxy and the cold plate as current is drawn from the cells, or as the cells are being charged. The bottom of the cell 18 is in contact with the epoxy resin material. In some embodiments, another material for thermal conductibility is used instead of the epoxy.

Optionally, a locating feature 52 may be incorporated to locate the intermediate tray 10 in the correct location on the cell frame 6. The locating feature may be, for example, a boss projecting upward from the upper surface of the cell frame 10 and a corresponding recess in the bottom surface of the intermediate tray 10. One or more locating features may be incorporated into the cell holder. Other forms of locating features may be used, such as a pin and hole combination, or a ridge and slot.

In some embodiments, the cell frame 6, the intermediate tray 10 and the top tray 14 are made of a plastic material, such as a polycarbonate/acrylonitrile-butadiene-styrene (PC/ABS) blend polymer or a fiber reinforced polycarbonate. Different plastics may be used for each of the cell frame 6, the intermediate tray 10 and the top tray 14. Different plastics may be used, for example, to tune a snap fit or to resist slumping when exposed to venting gases.

In some embodiments, for manufacturing purposes, the geometry of the cell frame 6 and the trays 10 and 14 may be different. For example, the walls of cell frame 6 may be slightly inclined to facilitate the molding process. Other lead-ins and molding drafts may also be incorporated.

In some embodiments, there are no protrusions 54, 58. Instead, the recess 24 in the lower portion of the intermediate tray 10 acts as a guide to align the cell 18 in the cavity 20 of the cell frame 6. To do this, the recess 24 in the lower portion of the intermediate tray 10 is smaller in diameter than the cavity 20 that hosts the cell 18 in the cell frame 6. This way, the cell 18 positioned in the cavity 20 of the cell frame 6 is centered in the cavity 20 by the recess 24 of the lower portion of the intermediate tray 10.

Figure 2:
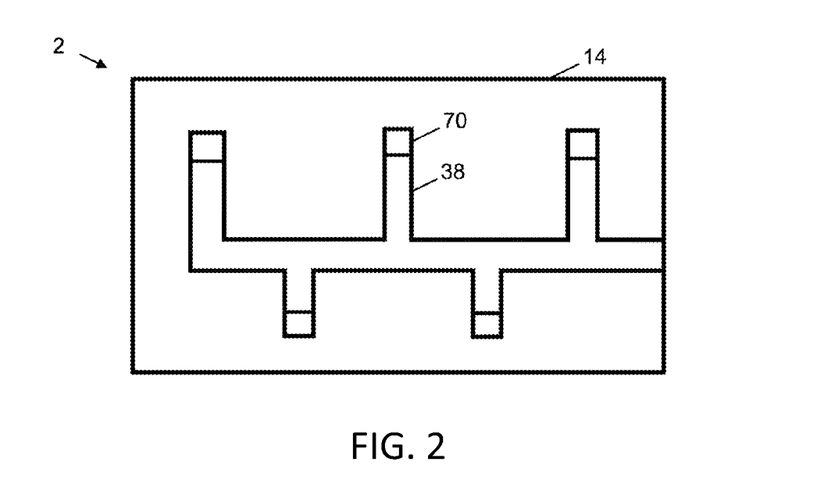
FIG. 2 is a schematic drawing representing the cell holder seen from above, according to an embodiment of the present invention.

Referring to FIG. 2 there is shown the cell holder 2 as seen from above, with the top tray 14 and the negative busbar 38. The cell holder 2 hosts five cells 18 with the negative terminal of each one of them connected to ends 70 of the negative busbar 38.

Figure 3:
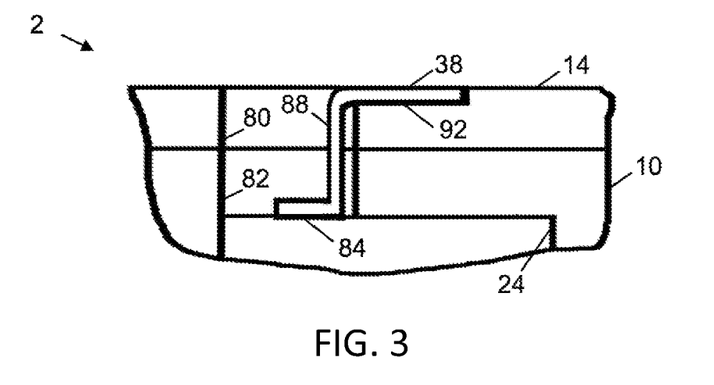
FIG. 3 is a schematic drawing representing a sectional view of the cell holder upper portion as seen from the side, according to an embodiment of the present invention.

Referring to FIG. 3 there is shown a top portion of the cell holder 2 without the cell 18. The negative busbar 38 is inserted through a hole 80 in the top tray 14 and a correspondingly aligned hole 82 in the intermediate tray 10. The holes 80, 82 are large enough to allow the negative busbar 38 to be spot welded to the negative terminal, or crimp, of the cell 18. In some embodiments, the negative busbar 38 is bonded ultrasonically to the cell terminals. The negative busbar 38 has an approximately horizontal tab 84 that is flush with or enters slightly into the recess 24 of the intermediate tray 10, depending on the particular dimensions of the cells 18 and the cell holder 2. The negative busbar 38 has a middle vertical section 88 and a top horizontal section 92. The top horizontal section 92 fits into a slot in the top surface of the top tray 14.

Figure 4:
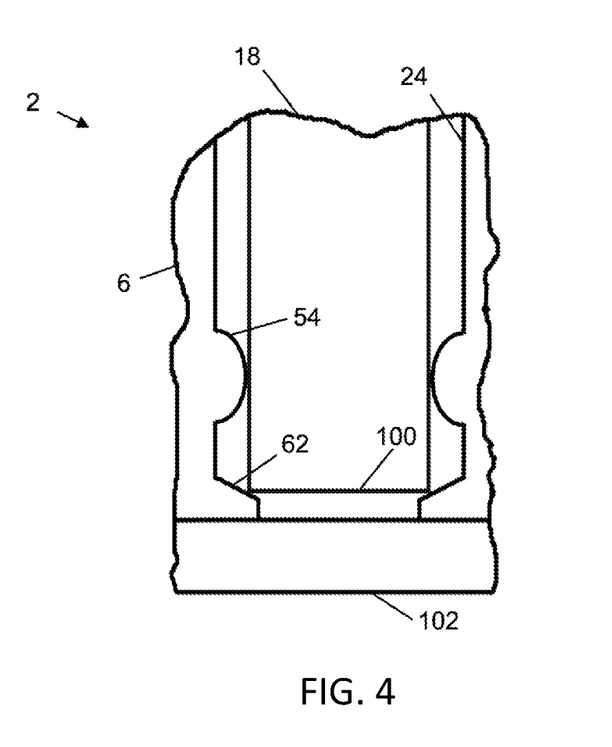
FIG. 4 is a schematic drawing representing a sectional view of the cell holder bottom portion as seen from the side, according to an embodiment of the present invention.

Referring to FIG. 4 there is shown a bottom portion of the cell holder 2. The bottom protrusions 54 hold the cell 18 centrally in the cavity 20 of the cell frame 6. The ledge 62 supports the cell 18. The ledge 62 forms a well filled with epoxy resin material 100. The epoxy resin material 100 glues the bottom of the cell 18 to a cold plate 102 positioned underneath the cell frame 6. In some embodiments, there may be a mechanical connection, using screws for example, of the cell holder 2 to the cold plate 102 to ensure that there is an even pressure and flatness of the cold plate. The cold plate may be referred to as a cooled plate, with cooling provided by circulating coolant fluid or by air cooling during operation. The use of screws here allows for the completion of the assembly of the cell holder before the glue cures. Such completion may involve, for example, the welding of the negative busbar to the cells.

Figure 5:
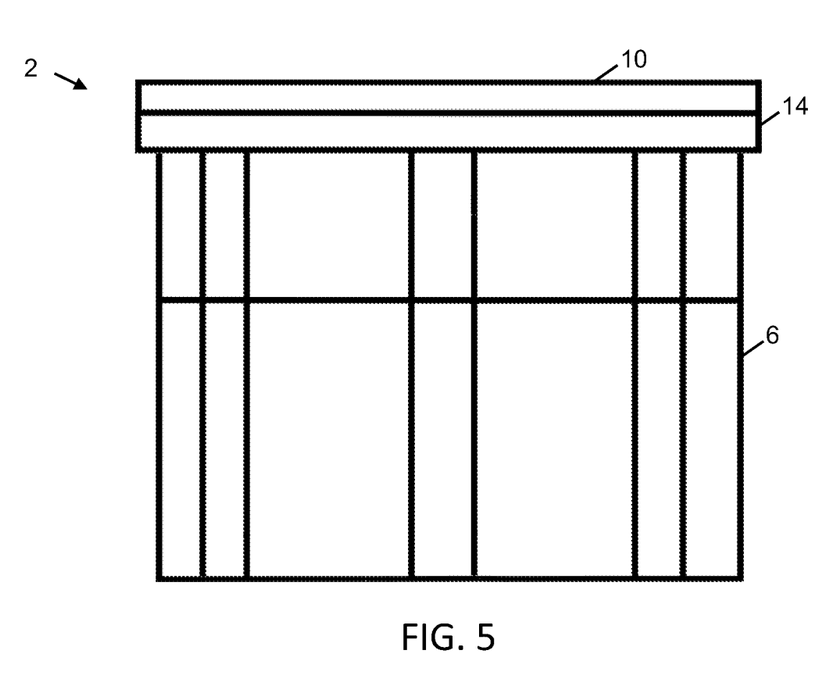
FIG. 5 is a schematic drawing representing the cell holder seen from the side, according to an embodiment of the present invention.

Referring to FIG. 5 there is shown the battery cell holder 2 as seen from the side. The top tray 10 is positioned over the intermediate tray 14. The intermediate tray 14 is positioned over the cell frame 6.

Figure 6:
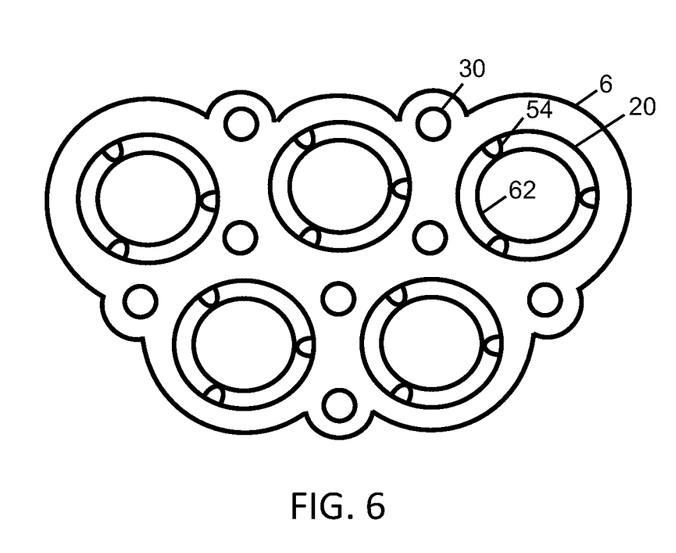
FIG. 6 is a schematic drawing representing the cell frame seen from above, according to an embodiment of the present invention.

Referring to FIG. 6 there is shown the cell frame 6 as seen from above. The cell frame 6 has cavities 20 with bottom protrusions 54 and ledge 62. The cell frame 6 has cavities 30 that host the studs 22 from the top tray 14. In some embodiments, the ratio of snap locks to cells is between 1:1 and 10:1.

Figure 7:
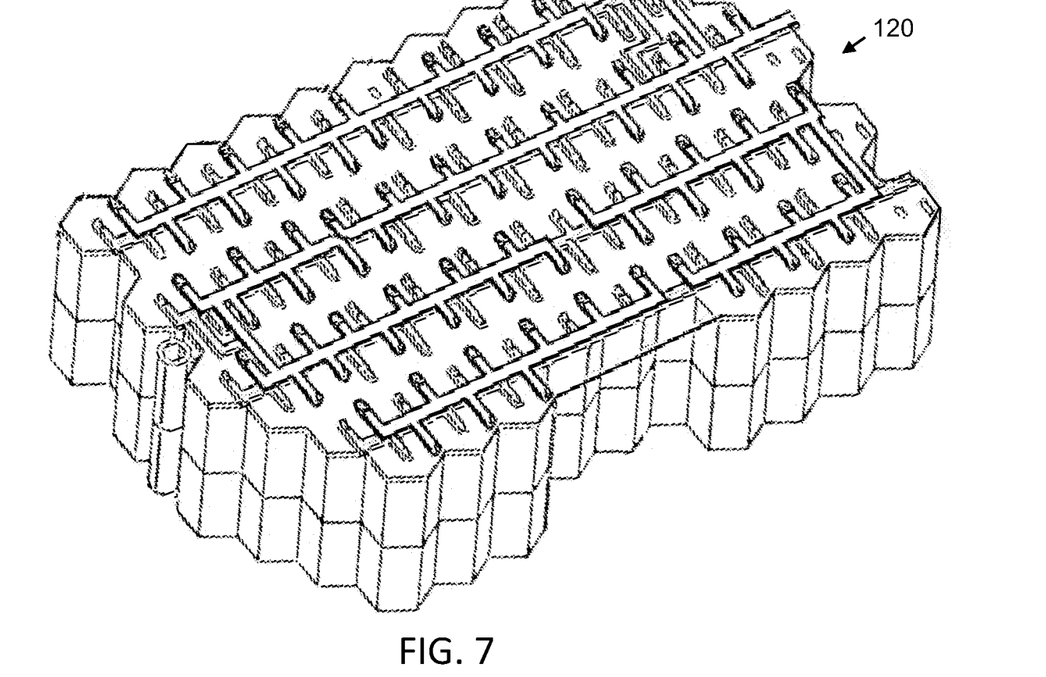
FIG. 7 is a perspective view of a cell holder, according to another embodiment of the present invention.

Referring to FIG. 7 there is shown an example of a cell holder 120 for numerous cells. In some embodiments, a cell holder may be a module in a battery pack that has four or any other number of connected modules. The modules are mechanically connected to each other, including the connections between the busbars of the different modules. There is no welding between adjacent modules. A module is thus the smallest changeable unit of the battery pack if a defective cell needs to be replaced.

C. Process

Figure 8:
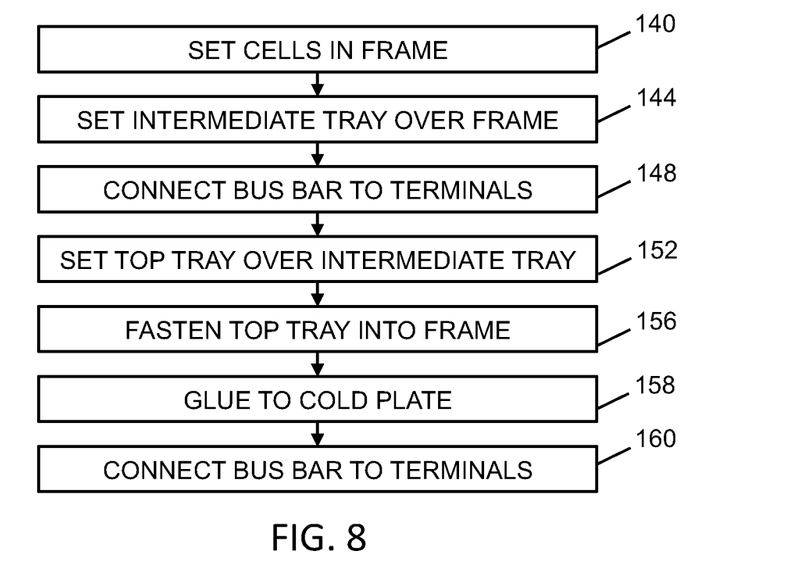
FIG. 8 is a flowchart describing the steps of the assembly process of the cell holder, according to an embodiment of the present invention.

Referring to FIG. 8, there is shown the steps to assemble the cell holder. In step 140, the cells are placed in the cell frame. Then in step 144, the intermediate tray is set over the cell frame with the cells already in place. After that, the positive busbar is connected to the terminals in step 148, for example by welding. The top tray is set over the intermediate tray in step 152. Next, the top tray is fastened to the cell frame in step 156, holding the intermediate tray in place. Optionally, the cold plate is then glued to the bottoms of the cells in the cell holder, in step 158. After this, the negative busbar is welded to the negative terminals in step 160.

D. Variations

Figure 9:
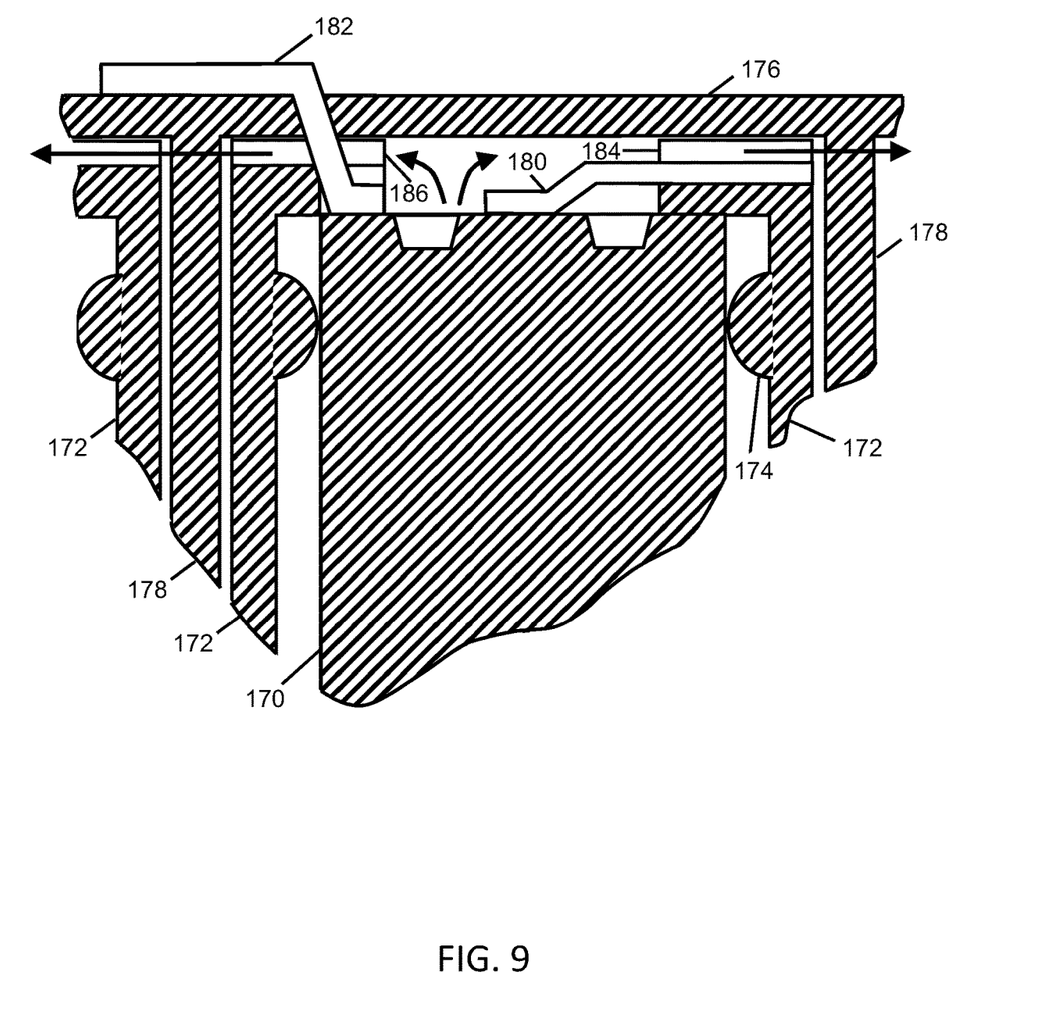
FIG. 9 is a schematic cross-section of an upper portion of a cell holder with vents, according to an embodiment of the present invention.

Referring to FIG. 9, an embodiment is shown in which there are vent paths incorporated into the cell holder. The upper portion of the cell 170 is shown with the intermediate tray 172 above and around it, locating it centrally in the recess of the intermediate tray with the protrusions 174. The top tray 176 is located above the intermediate tray 172, and has studs 178 that project down from the underside of the planar portion of the top tray. Not shown are snap locks at the bottom of the studs 178 that hold the cell holder together. Positive busbar 180 and negative busbar 182 connect to the terminals of the cell 170.

In contrast to other embodiments, this embodiment has vents 184, 186 formed in the upper region of the intermediate tray 172. The vents 184, 186 may be, for example, channels that are present in the upper surface of the intermediate tray 172. Other forms of the vents may be used in other embodiments. The vents 184, 186 allow hot gases from the cells 170 to escape in the event that one or more of the cells begin to fail. By allowing the hot gases to escape, the other cells around the failing one do not get heated by the hot gases.

Other implementations of the vent routing are possible in other embodiments. For example, channels may be present in the lower surface of the top, planar portion of the top tray. The main requirement is to provide a path that directs the hot gases away from the failing cell and to the exterior of the cell holder, so as not to cause a potential thermal runaway effect.

In other embodiments, the snap lock engages with slots on the inner surface of the hole 30 rather than on a step. An alternate connection method to join together the trays and the frame is a heat stake. Heat staking has the advantage of the stake shrinking when cooled to tension the joint.

In other embodiments there are more than three protrusions 54, 58 in each cell cavity. In other embodiments, there are two or even one protrusion shaped like ribs that extend sufficiently around the circumference of the cell cavity to centralize it. Busbars may be connected to the polarities opposite to those described above.

In general, unless otherwise indicated, singular elements may be in the plural and vice versa with no loss of generality.

Depending on the embodiment, one or more of the advantages described herein may be provided.

Throughout the description, specific details have been set forth in order to provide a more thorough understanding of the invention. However, the invention may be practiced without these particulars. In other instances, well known elements have not been shown or described in detail and repetitions of steps and features have been omitted to avoid unnecessarily obscuring the invention. Accordingly, the specification and drawings are to be regarded in an illustrative, rather than a restrictive, sense.

It will be clear to one having skill in the art that further variations to the specific details disclosed herein can be made, resulting in other embodiments that are within the scope of the invention disclosed. All parameters, proportions, materials, and configurations described herein are examples only and may be changed depending on the specific embodiment. Accordingly, the scope of the invention is to be construed in accordance with the substance defined by the following claims.

The invention claimed is:

1. A cell holder for one or more cells comprising:
   a frame that hosts one or more cells such that a portion of each cell projects beyond a top of the frame, wherein the frame defines holes each with a retaining surface;
   an intermediate tray on top of the frame and having one or more recesses each of which accommodates one of the projecting portions of the one or more cells; and
   a top tray on top of the intermediate tray, wherein the top tray comprises studs each with a snap lock at its extremity and is fastened to the frame through the intermediate tray, wherein the intermediate tray defines further holes through each of which one of the studs passes to engage irreversibly with one of the retaining surfaces, thereby holding the intermediate tray in place.

2. The cell holder of claim 1, comprising, in each recess, one or more protrusions on a wall of the recess to maintain the cell that is accommodated by the recess centered in a plane of the protrusions.

3. The cell holder of claim 1, wherein the frame defines a cavity for each cell that it hosts.

4. The cell holder of claim 3, wherein the one or more recesses in the intermediate tray are aligned with the one or more cavities in the frame.

5. The cell holder of claim 4, wherein each recess has a smaller diameter than the corresponding cavity.

6. The cell holder of claim 3, comprising, in each cavity, one or more protrusions on a wall of the cavity to maintain the cell that is in the cavity centered in a plane of the protrusions.

7. The cell holder of claim 3, wherein each cavity has a ledge at a bottom section thereof that supports the cell in the cavity.

8. The cell holder of claim 7, wherein each cavity is open to a bottom surface of the frame.

9. The cell holder of claim 8, comprising a cooled plate that is glued to bottom surfaces of the one or more cells when the one or more cells are in the cell holder.

10. The cell holder of claim 1, wherein each retaining surface is a step in a wall of one of the holes.

11. The cell holder of claim 1, wherein a ratio of snap locks to cells is between 1:1 and 10:1.

12. The cell holder of claim 1, wherein the frame, the intermediate tray and the top tray are made of polycarbonate/acrylonitrile-butadiene-styrene.

13. The cell holder of claim 1, comprising a negative busbar in the top tray and a positive busbar in the intermediate tray.

14. The cell holder of claim 1, comprising locating features in the frame and the intermediate tray that engage with each other.

15. The cell holder of claim 1, wherein the intermediate tray, the top tray, or both the intermediate and top trays define vents between top surfaces of the one or more cells and an exterior of the cell holder.

16. A method for assembling a cell holder for one or more cells comprising:
   placing one or more cells in a frame that hosts the one or more cells such that a portion of each cell projects beyond a top of the frame;
   placing an intermediate tray on top of the frame, the intermediate tray having one or more recesses which accommodates one of the portions of the one or more cells that project beyond the top of the frame;
   connecting a busbar in the intermediate tray to a terminal on each of the one or more cells;
   placing a top tray on top of the intermediate tray; wherein the top tray comprises studs each with a snap lock at its extremity
   irreversibly fastening the top tray to the frame through the intermediate tray, thereby holding the intermediate tray in place; and
   connecting another busbar in the top tray to a second terminal on each of the one or more cells.

17. The method of claim 16 comprising gluing bottom surfaces of the one or more cells to a cooled plate.

* * * * *